United States Patent [19]

Dahlby

[11] E Patent Number: Re. 32,823

[45] Reissued Date of Patent: Jan. 10, 1989

[54] APPARATUS AND METHOD FOR SEGREGATING PARTS

[75] Inventor: Larry C. Dahlby, Racine, Wis.

[73] Assignee: S. C. Johnson & Son, Inc., Racine, Wis.

[21] Appl. No.: 149,047

[22] Filed: Jan. 27, 1988

Related U.S. Patent Documents

Reissue of:

[64] Patent No.: 4,676,380
Issued: Jun. 30, 1987
Appl. No.: 821,661
Filed: Jan. 23, 1986

[51] Int. Cl.[4] ..... B07C 5/04; B07C 5/36

[52] U.S. Cl. ..... 209/616; 209/628; 425/215

[58] Field of Search ..... 209/606, 615, 616, 625, 209/628, 659, 667, 671, 607; 425/215–217, DIG. 51

[56] References Cited

U.S. PATENT DOCUMENTS

| | | | |
|---|---|---|---|
| 781,616 | 1/1905 | Owens et al. | 209/607 |
| 1,012,046 | 12/1911 | Anderson | 209/616 |
| 2,114,263 | 4/1958 | Heaslet | 209/616 |
| 2,710,097 | 6/1955 | Bolles | 209/12 |
| 3,047,149 | 7/1962 | DeKoning | 209/645 |
| 3,651,938 | 3/1972 | Sullentrop, Jr. | 209/663 |
| 3,661,256 | 5/1972 | Hain | 209/645 |
| 3,663,142 | 5/1972 | Cafarelli | 425/217 |
| 3,982,632 | 9/1976 | DeLeon et al. | 209/616 |
| 4,224,350 | 9/1980 | Merck | 209/663 X |
| 4,232,506 | 11/1980 | Studer | 209/616 |
| 4,264,012 | 4/1981 | Paradis | 209/664 |
| 4,454,030 | 6/1984 | Young | 209/669 |
| 4,484,684 | 11/1984 | Tetreault | 209/616 |

FOREIGN PATENT DOCUMENTS

| | | | |
|---|---|---|---|
| 679042 | 1/1964 | Canada | 209/616 |

*Primary Examiner*—Robert B. Reeves
*Assistant Examiner*—Donald T. Hajec

[57] ABSTRACT

An improved device and method for segregating molded parts and runners flowing from a molding operation is disclosed. The device includes a restricted flow space, an array of fingers filling the space and movable therein to capture and lift runners away from the space, and strippers removing the runners to a lateral position. Preferred embodiments include a cylindrical chute and a rotating array.

21 Claims, 3 Drawing Sheets

APPARATUS AND METHOD FOR SEGREGATING PARTS

Matter enclosed in heavy brackets [ ] appears in the original patent but forms no part of this reissue specification; matter printed in italics indicates the additions made by reissue.

FIELD OF THE INVENTION

This invention is related generally to the segregation of formed parts of fixed dimension from unwanted pieces and, more particularly, to the segregation of molded production parts from elongated runners which are a by-product of the molding process.

BACKGROUND OF THE INVENTION

In molding operations, there is a need for sorting the output of the molding machine into two separate groups—one of acceptable molded parts and the other of molding by-products such as elongated runners which will be recycled.

Usually the product emerges from the molding machine, which cycles automatically, with acceptable molded parts already broken away from the runners, and a jumbled mixture of randomly oriented molded parts and runners moves from the molding machine on conveying apparatus. The parts and runners are ready for sorting—that is, segregation into separate groups.

The process of sorting the output of molding machines is often carried out by hand. However, devices have been provided to eliminate the need for manual sorting.

Examples of prior art devices and methods for segregation of plastic parts from unwanted runners and the like are those disclosed in U.S. Pat. Nos. 4,264,012, 4,454,030, 3,651,938, 3,982,632 and 4,484,684.

Experience has shown that the devices and methods of the prior art have certain problems and deficiencies. In particular, some prior devices and methods are less than thorough in their segregation of parts from runners.

More specifically, runners too frequently fall between members intended to catch or hold them and end up with the plastic parts. This can necessitate subsequent manual separation or can result in the jamming of product flow in subsequent assembly operations.

In modern factories for plastic molding and subsequent assembly or use of plastic parts, there is a need for an improved segregating device and method which eliminates or minimizes the incidence of mis-sorting. Improved devices and methods should be capable of high-speed in-line operation with minimal operator attention.

BRIEF SUMMARY OF THE INVENTION

This invention is an improved device and an improved method for segregating the molded products and runners which come from molding operations.

The inventive device includes path means which restricts the jumbled flow to a fixed flow space, a three-dimensional array of pickup fingers substantially filling and extending beyond the fixed flow space, means to continuously move successive portions of the finger array out of and back into the fixed flow space, and stripping means between the fingers and extending from the fixed flow space laterally to an adjacent position.

The fingers are spaced apart by distances which are greater than the predetermined dimensions of the molded parts but less than the runner length. The fingers all have distal ends which are closely adjacent to the chute inner wall which defines the fixed flow space. The movement of the array allows the molded parts to pass through the array, but captures and lifts the runners to a position over the stripping means. Then, as the fingers pass downwardly through the stripping means, the runners are deposited thereon for further lateral movement away from the segregator device.

In preferred embodiments, the path means is a chute having a cylindrical inside surface which defines the fixed flow space. The chute also has a lateral opening in the cylindrical wall, and the stripping means extends through the lateral opening. The chute is preferably tilted to provide a gravity feed of parts through it during the separating operation.

The three-dimensional array preferably is mounted on a shaft which extends concentrically along the chute and has a plurality of finger-mounting members spaced along it with means on them for attachment of the pickup fingers. In such embodiments, the moving means rotates the shaft and the array of fingers thereon about the fixed axis of such shaft.

In highly preferred embodiments, the finger-mounting members along the shaft each have a plurality of fingers secured thereto and extending in radial directions from a common axial position. And, the stripping means is an aligned array of stripping elements each extending from a position over the shaft to a position beyond the cylindrical wall. The stripping elements are axially spaced to form slots each of which receives the fingers. on one of said finger-mounting members.

The stripping elements, which are stationary, have aligned runner-receiving upper surfaces. In highly preferred embodiments, the runner-receiving surfaces are inclined toward positions beyond the cylindrical wall, such that the force of gravity will feed runners thereon away from the fixed flow space. And, the stripping elements and array are positioned such that the projections of the circles which are defined by the rotation of the distal ends intersect the runner-receiving surfaces at an inclined portion thereof. This insures that, upon release of the runners from the fingers passing between the stripping elements, they will slide away from the device.

In one highly preferred embodiment, the fingers on every other finger-mounting member (or "hub") along the shaft are attached at radially offset positions. This is helpful in barring the unintended passage of runners through the array of fingers.

The method of this invention includes directing the flow of parts and runners into an inclined fixed flow space, continuously rotating successive portions of the three-dimesional array of fingers through the fixed flow space, out of and into the space to move the runners therefrom, and stripping the runners from the fingers when out of the space. Preferred embodiments of the method utilize rotation of the array of fingers, and utilize the apparatus described above.

OBJECTS OF THE INVENTION

It is an object of this invention to provide an improved device and method for segregating molded parts and runners flowing from a plastic molding operation.

Another object of this invention is to provide a device and method for segregating molded parts requiring little or no human attention during its operation.

Another object of this invention is to provide a device and method for segregating molded parts and runners which reduce the incidence of mis-sorting.

These and other objects will be apparent from the following additional descriptions and from the drawings, wherein:

DETAILED DESCRIPTION OF PREFERRED EMBODIMENTS

The figures illustrate a segregator device 10 in accordance with this invention for separating parts of predetermined dimensions from a jumbled flow of such parts and elongated runners. Device 10 is particularly useful in separating molded plastic parts from a jumbled flow of such parts and the elongated plastic runners from which they have previously been broken.

Figures 1, 4:
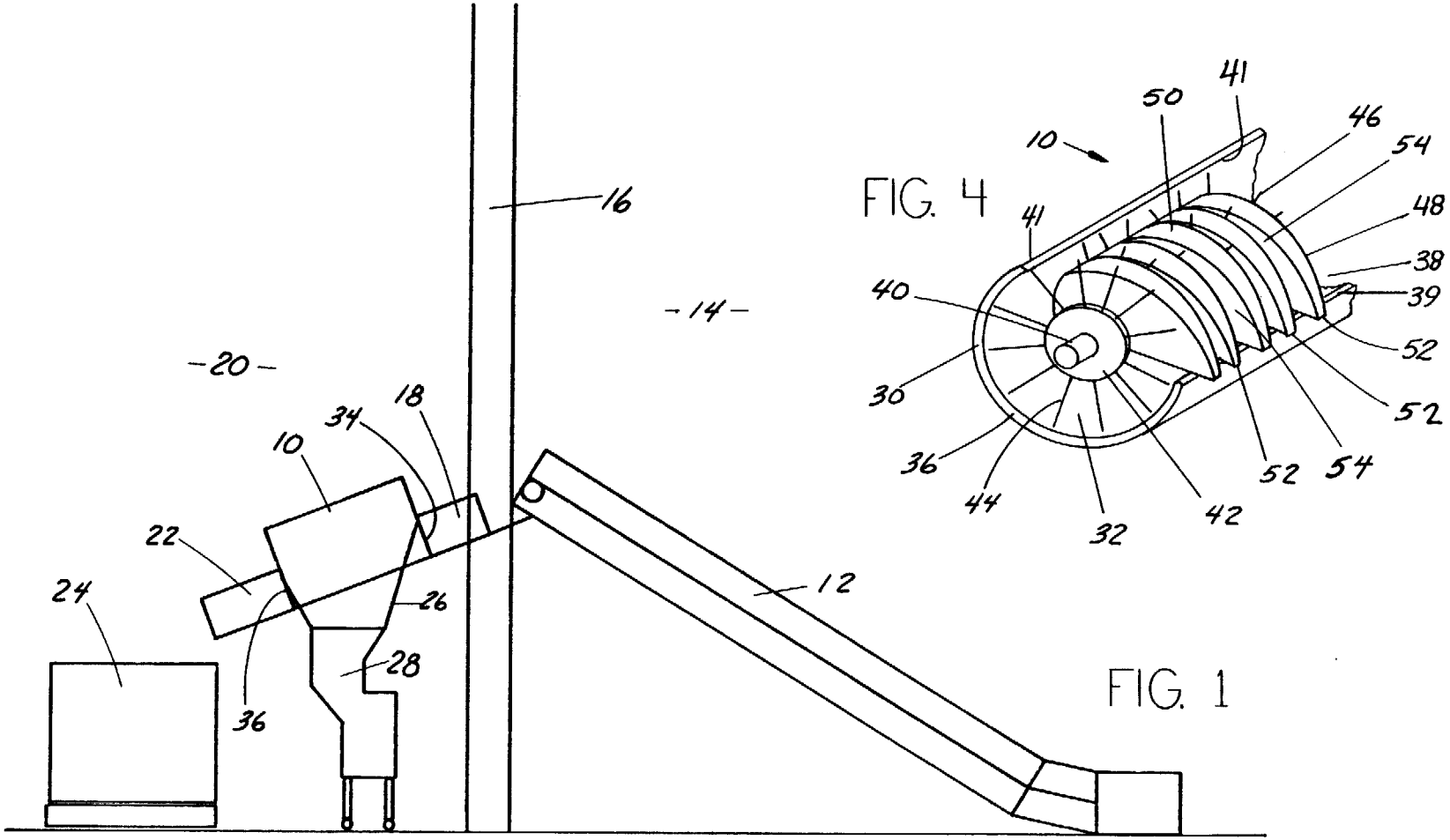
FIG. 1 is a schematic side elevation illustrating the location of the device of this invention in a plastic molding operation.
FIG. 4 is a fragmentary perspective view.
Figure 3:
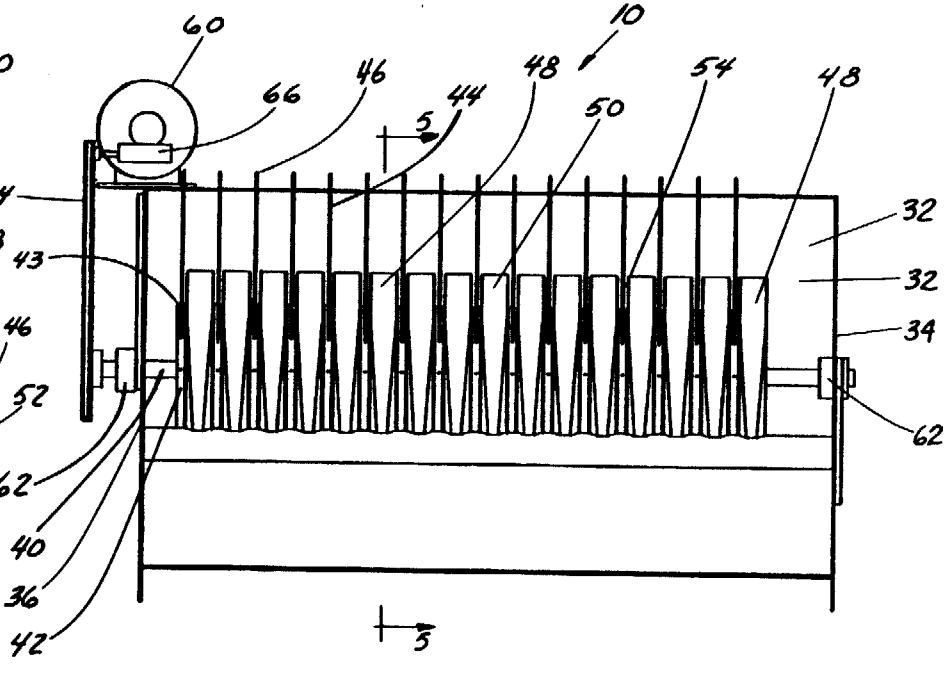
FIG. 3 is a right side elevation of FIG. 2.

FIG. 1 illustrates the general location and orientation of segregator 10 as it would be placed in a plastic parts production facility. An upwardly-directed conveyor 12 carries the jumbled plastic parts and elongated runners from molding equipment (not shown) in molding room 14 to an opening in wall 16 where they are dropped from conveyor 12 into a lead chute 18 in a sorting and storage room 20. Lead chute 18 guides the jumbled flow of molded parts and elongated runners, under the force of gravity, into segregator 10.

Device 10 segregates the molded parts from the elongated runners in the manner which will be described. The molded parts slide out of segregator device 10 and downwardly into and through exit chute 22 and from there into storage container 24. The elongated runners are lifted out of the jumbled flow by the action of segregator 10. From segregator 10, the runners move laterally into a side chute 26 and then into a grinder 28, which will grind the runners in preparation for subsequent plastic processing.

Referring now to FIGS. 2–5, segregator 10 includes a main chute 30 having a cylindrical inner surface 32. Main chute 30 has a lead end 34, into which the jumbled plastic parts and elongated runners flow, and an exit end 36, from which the plastic parts alone exit device 10.

Main chute 30 is preferably tilted as shown in FIG. 1, so that gravity may be used to move the jumbled flow of molded plastic parts and elongated runners through device 10. To aid in such gravity flow, cylindrical inner surface 32 is preferably quite smooth. While the tilt should be sufficient for reliable flow through chute 30, the tilt should not be too steep, because too much tilt can slightly increase the chance of unintended passage of a runner all the way through chute 30. A tilt of 20 degrees from horizontal has been found to be acceptable.

Main chute 30 has an opening 38 along its upper portion and a portion of one side which is used for removal of the elongated runners after they are separated from the jumbled flow. Opening 38 extends from lateral edge 39 to upper edge 41, both of which extend substantially parallel to the axis defined by shaft 40 for the full length of chute 30.

A shaft 40, supported by bearing means 62, is located within the space defined by main chute 30 and is concentric with respect to cylindrical inner surface 32. Shaft 40 extends along the full length of main chute 30. Shaft 40 turns in bearings 62 by means of a drive motor 60 which is linked to shaft 40 by gear box 66 and chain-drive means 64.

Fixed to shaft 40 at positions which are spaced equally therealong are a number of hubs 42. Hubs 42 rotate with shaft 40. Each of the hubs 42 has a circumferential surface 43. A number of rod-like fingers 44 are secured to hubs 42 along their circumferential surfaces 43. On each hub, the fingers 44 are equally spaced along circumferential surface 43. Fingers 44 all have the same length and all extend along radii centered on their hubs 42 and on shaft 40.

The length of fingers 44 should be chosen such that their distal ends 46 are closely adjacent to cylindrical inner surface 32. If fingers 44 are flexible, the length of fingers 44 can be such that distal ends 46 may be in contact with inner surface 32 during some portion of the rotation of fingers 44.

The fingers 44 together form a three-dimensional array of pick-up fingers positioned to substantially fill the confined space in main chute 30 defined by cylindrical inner surface 32. The array rotates with shaft 40, with all portions thereof moving repeatedly into and out of the confined space within chute 30. Such rotation is in a clockwise direction as viewed in FIGS. 2 and 4, such that after fingers 44 pass upper edge 41 they pass through stripper elements, hereafter described, and then pass lateral edge 39 upon again entering the confined space in chute 30.

Fingers 44 of the array are spaced apart, at their distal ends 46 and at points near such ends, by distances greater than the dimensions of the plastic parts to be separated from the jumbled flow of plastic parts and elongated runners. The spacing of fingers 44, however, is preferably less than the length of the elongated runners.

In a preferred arrangement of fingers 44, alternating hubs have fingers which are aligned with spaces between the fingers of the adjacent hubs. This arrangement, illustrated in FIG. 4, eliminates or nearly eliminates any unintended passage of any elongated runners through main chute 30.

By virtue of such spacing of fingers 44, the plastic parts sliding through main chute 30, while they might engage fingers 44 during such movement, will find their way through the array of fingers 44 under the force of gravity to exit main chute 30 at its exit end 36. On the other hand, the elongated runners in main chute 30 will be captured, or tilted and then captured by fingers 44, then moved by fingers 44 along cylindrical inner surface 32, and finally lifted by fingers 44 for lateral removal from main chute 30.

Such removal is accomplished by the interaction of the rotating array of fingers 44 with an aligned array of stripper elements 48. Slots 54, which are perpendicular to shaft 40 and aligned with hubs 42, are defined between adjacent pairs of stripper elements 48. The positioning and orientation of slots 54 is such that the fingers 44 of each hub turn within one of the slots 54.

Figure 5:
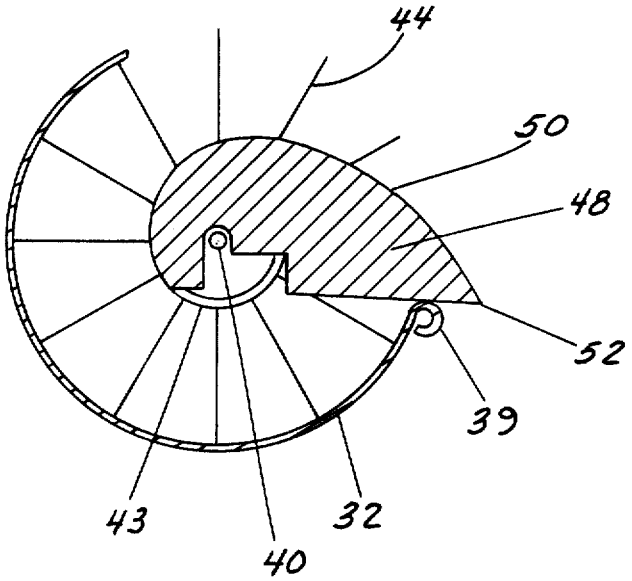
FIG. 5 is a sectional view taken along section 5—5 as indicated in FIG. 3.

Each stripper element 48 is supported at one end by shaft 40 and at the other end by lateral edge 39 of lateral opening 38, as shown in FIG. 5. Stripper elements 48 are preferably supported in the appropriate spacing by hubs 42.

Stripper elements 48 have upwardly-facing surfaces 50 which are in alignment such that together they form a runner reception surface on which the elongated runners are deposited by the rotating action of the array of fingers 44 and from which such runners slide laterally and downwardly into side chute 26 and ultimately into grinder 28.

Figure 2:
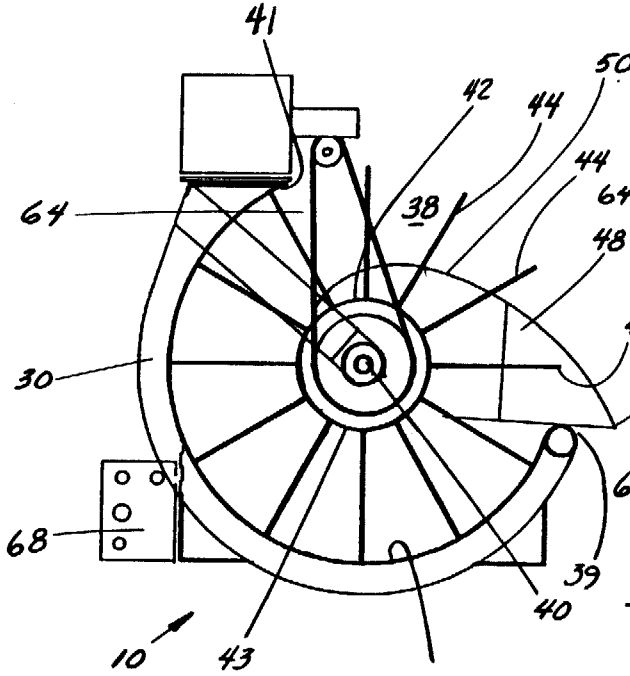
FIG. 2 is a side elevation of a preferred segregating device in accordance with this invention, taken from the downstream end thereof.

The runner reception surface formed by upper surfaces 50 of stripper elements 48 extends from a position within the array of fingers 44 to a lateral position outside such array. Such runner reception surface has a terminal edge 52, as indicated in FIG. 2, which is well outside the array of fingers 44.

The runner reception surface formed by upper surfaces 50 and the circles formed by the movement of distal ends 46 of fingers 44 intersect at a position on the down slope of the runner reception surface. It is at this point of intersection that elongated runners which have been removed from the jumbled flow coming into device 10 are released from the array of fingers 44 to slide into side chute 26.

Fingers 44 are preferably nylon rods or are made of other relatively rigid yet somewhat flexible materials. The ability of fingers 44 to flex to some extent will prevent any jams or damage caused by unexpected conditions.

Variations can be made in the device described herein to adapt it for different segregating jobs. For example, changes in the sizes of the parts and the elongated runners would require changes in the arrangement and/or spacing of fingers 44. Also, the speed of rotation of fingers 44 can be adjusted by varying the speed of motor 60 by a conventional motor control means 68.

The segregator of this invention may be made using materials and parts which are well known to those skilled in the art. Appropriate choices would be apparent to those familiar with this disclosure.

While the principles of this invention have been described in connection with specific embodiments, it should be understood clearly that these descriptions are made only by way of example and are not intended to limit the scope of the invention.

What is claimed:

1. A device for segregating molded production parts of predetermined dimensions from a jumbled flow of such parts and runners longer than said predetermined dimensions, comprising:

path means, including a chute having a cylindrical inside surface defining a lateral opening therethrough, for restricting jumbled flow to a fixed flow space along a flow length, the cylindrical surface defining the fixed flow space;

a three-dimensional array of pickup fingers substantially filling the fixed flow space and extending therebeyond, said fingers spaced apart by distances greater than the predetermined dimensions of the molded production parts, the distal portions of the fingers being so disposed in the chute as to contact both the parts and the runners passing therethrough;

means to continuously move successive distal portions of the pickup finger array out of and into the fixed flow space, for selectively picking up and removing the runners from the cylindrical inside surface of the chute; and stationary means between the fingers and extending from the fixed flow space laterally to a position adjacent thereto, for receiving the runners from the pick-up finger array thereby stripping the runners from said fingers during pickup-finger array movement, the stationary stripping means extending through the cylindrical surface lateral opening.

2. The device of claim 1 wherein the chute is tilted to provide a gravity feed of parts therethrough.

3. The device of claim 1 wherein the three-dimensional array comprises a shaft extending concentrically along said chute, a plurality of finger-mounting members spaced along the shaft, and means on the finger-mounting means to attach said pickup fingers thereto, and wherein said moving means comprises means to rotate said array on said shaft.

4. The device of claim 3 wherein the fingers have distal ends closely adjacent to the cylindrical surface.

5. The device of claim 4 wherein said finger-mounting members each have a plurality of said fingers secured thereto and extending in radial directions from a common axial position.

6. The device of claim 5 wherein the stripping means comprises an aligned array of stripping elements each extending from a position over said shaft to a position beyond the cylindrical wall, said stripping elements being axially spaced to form slots each of which receives the fingers on one of said finger-mounting members.

7. The device of claim 6 wherein the stripping elements have aligned runner-receiving surfaces.

8. The device of claim 7 wherein the runner-receiving surfaces are inclined toward positions beyond the cylindrical wall, whereby the force of gravity will feed runners thereon away from the fixed flow space.

9. The device of claim 8 wherein a projection of the circles defined by rotation of the distal ends intersects the runner-receiving surfaces at an inclined portion thereof, whereby upon release of runners they will slide thereon away from the device.

10. The device of claim 5 wherein the fingers on alternating finger-mounting members along the shaft are attached to their mounting members at radially offset positions.

11. The device of claim 1 wherein said fingers are spaced apart by a distance less than the runner length.

12. The device of claim 11 wherein the stripping means comprises an aligned array of stripping elements spaced to form slots each of which receives some of the fingers.

13. The device of claim 12 wherein the stripping elements have aligned runner-receiving surfaces.

14. The device of claim 13 wherein the runner-receiving surfaces are inclined toward positions extending laterally from the path, whereby the force of gravity will feed runners thereon away from the fixed flow space.

15. The device of claim 14 wherein said fingers rotate in circular paths through said slots and wherein a projection of the circles defined by rotation of the distal ends intersect the runner-receiving surfaces at an inclined portion thereof, whereby upon release of runners they will slide thereon away from the device.

16. The device of claim 1 wherein the moving means rotates said array.

17. A method of segregating molded production parts of predetermined dimensions from a jumbled flow of such parts and runners longer than said dimensions, comprising:

directing said flow into a fixed flow space bounded by a cylindrical inside surface of a chute, the cylindrical inside surface defining a lateral opening through the chute, the cylindrical surface defining the fixed flow space, the fixed flow space being inclined for gravity flow therethrough;

rotating successive distal portions of a three-dimensional array of fingers relative to a stationary stripping means that extends through the chute lateral opening, the finger array substantially filling the fixed flow space, for selectively removing the runners from the chute, said fingers being spaced apart by more than the predetermined dimensions of the parts, the distal portions of the fingers being so disposed in the chute as to contact both the parts and the runners passing therethrough; and further rotating the distal portions of the finger array relative to the stationary stripping means for positioning the runners on the stationary stripping means, thereby stripping the runners from the fingers after the fingers have been so rotated relative to the stripping means as to have the distal portions thereof disposed out of the fixed flow space and in the direction of the chute lateral opening.

18. The method of claim 17 wherein the three-dimensional array comprises a shaft extending concentrically along said chute, means on the shaft attaching said pickup fingers thereto, said fingers having distal ends closely adjacent to the cylindrical surface, and wherein said rotation is about the axis of said shaft.

19. The method of claim 17 wherein said fingers are spaced apart by a distance less than the runner length.

*20. A device for segregating parts of predetermined dimensions from a jumbled flow of such parts and unwanted pieces longer than said predetermined dimensions, comprising:*

*path means, including a chute having a cylindrical inside surface defining a lateral opening therethrough, for restricting the jumbled flow to a fixed flow space along a flow length, the cylindrical surface defining the fixed flow space;*

*a three-dimensional array of pickup fingers substantially filling the fixed flow space and extending therebeyond, said fingers spaced apart by distances greater than the predetermined dimensions of the parts, the distal portions of the fingers being so disposed in the chute as to contact both the parts and the unwanted pieces passing therethrough;*

*means to continuously move successive distal portions of the pickup finger array out of and into the fixed flow space, for selectively picking up and removing the unwanted pieces from the cylindrical inside surface of the chute; and*

*stationary means between the fingers and extending from the fixed flow space laterally to a position adjacent thereto, for receiving the unwanted pieces from the pickup-finger array thereby stripping the unwanted pieces from said fingers during pickup-finger array movement, the stationary stripping means extending through the cylindrical surface lateral opening.*

*21. A method of segregating parts of predetermined dimensions from a jumbled flow of such parts and unwanted pieces longer than said predetermined dimensions, comprising:*

*directing said flow into a fixed flow space bounded by a cylindrical inside surface of a chute, the cylindrical inside surface defining a lateral opening through the chute, the cylindrical surface defining the fixed flow space, the fixed flow space being inclined for gravity flow therethrough;*

*rotating successive distal portions of a three-dimensional array of fingers relative to a stationary stripping means that extends through the chute lateral opening, the finger array substantially filling the fixed flow space, for selectively removing the unwanted pieces from the chute, said fingers being spaced apart by more than the predetermined dimensions of the parts, the distal portions of the fingers being so disposed in the chute as to contact both the parts and the unwanted pieces passing therethrough; and*

*further rotating the distal portions of the finger array relative to the stationary stripping means for positioning the unwanted pieces on the stationary stripping means, thereby stripping the unwanted pieces from the fingers after the fingers have been so rotated relative to the stripping means as to have the distal portions thereof disposed out of the fixed flow space and in the direction of the chute lateral opening.*

* * * * *